United States Patent [19]

Van Brakel

[11] 4,044,686
[45] Aug. 30, 1977

[54] REDUCED LENGTH VEHICLE CONVEYOR

[75] Inventor: Russel A. Van Brakel, Harshaw, Wis.

[73] Assignee: Haverberg Auto Laundry Equipment Co. Inc., Chicago, Ill.L

[21] Appl. No.: 627,222

[22] Filed: Oct. 30, 1975

[51] Int. Cl.² .............................................. B61B 13/12
[52] U.S. Cl. .................................. 104/172 B; 198/732
[58] Field of Search ............... 104/162, 172 R, 172 B; 198/170, 171, 732

[56] References Cited

U.S. PATENT DOCUMENTS

| | | | |
|---|---|---|---|
| 3,681,805 | 8/1972 | Shelstad | 104/172 B X |
| 3,789,766 | 2/1974 | Hurwitz | 104/172 B |

FOREIGN PATENT DOCUMENTS

| | | | |
|---|---|---|---|
| 2,308,505 | 2/1973 | Germany | 198/732 |

Primary Examiner—Robert J. Spar
Assistant Examiner—George F. Abraham

Attorney, Agent, or Firm—Seed, Berry, Vernon & Baynham

[57] ABSTRACT

A vehicle conveyor is provided with an upper wheel engaging active track and a lower inactive track. Rollers can be moved up by a roller up guide into the active track to engage the wheel of a vehicle for moving the vehicle along a path. The length of the conveyor is reduced by providing a roller down guide which can remove a roller from the active track along the length of the conveyor and by cycling the rollers such that the first roller on the active track engages the front wheel of a vehicle until the rear wheel of the vehicle is beyond the roller up guide, then an additional roller is raised to the active track behind the rear wheel of the vehicle and the first active roller is removed from the active track. Consequently, the vehicle is first moved by engagement by its front wheel and subsequently moved by engagement with its rear wheel to reduce the length of the conveyor.

2 Claims, 6 Drawing Figures

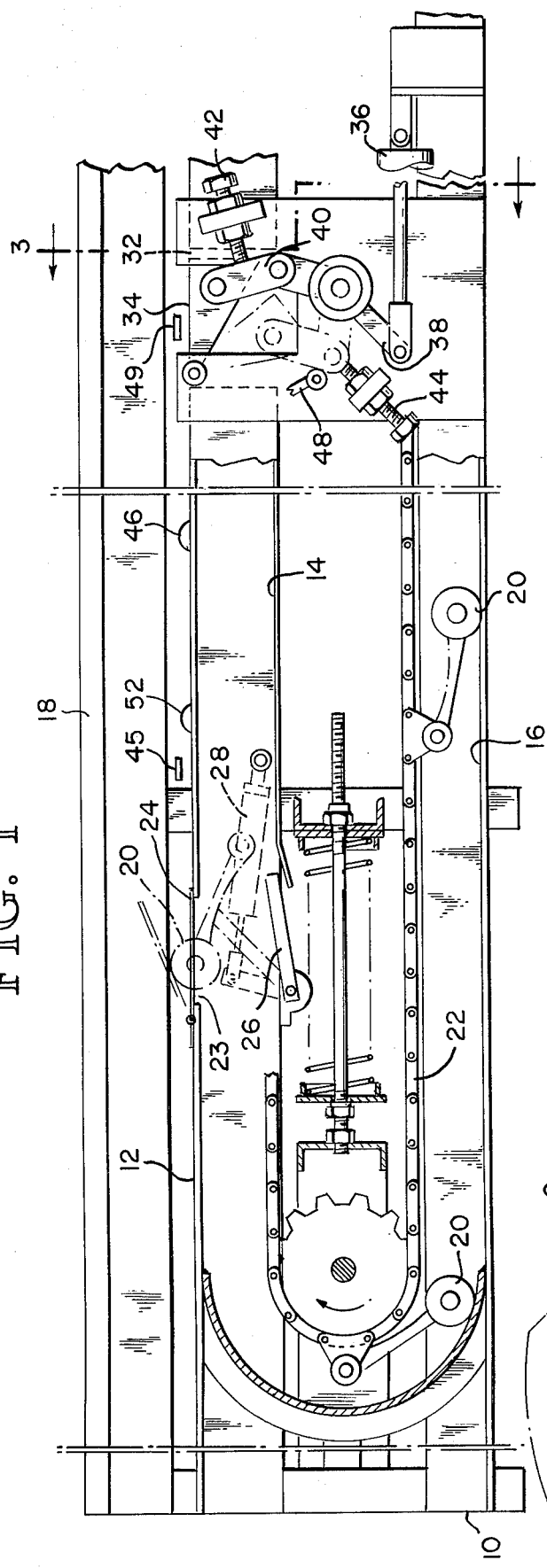
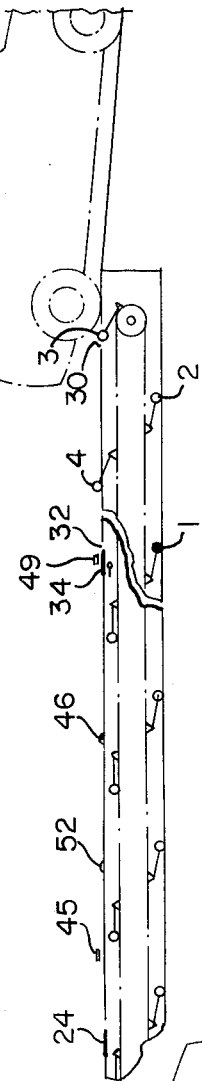
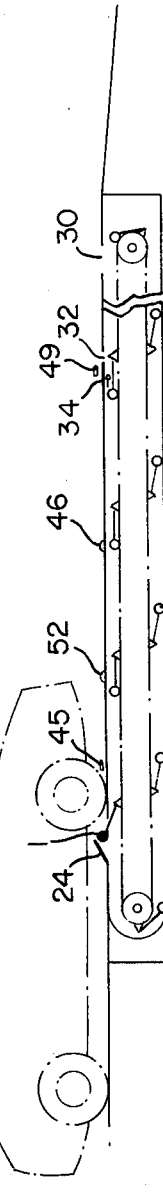
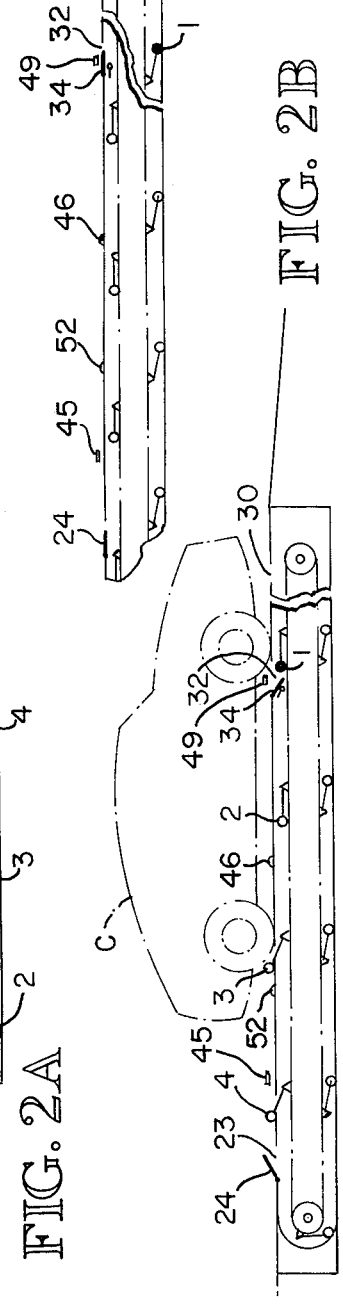

REDUCED LENGTH VEHICLE CONVEYOR

BACKGROUND OF THE INVENTION

1. Field of the Invention

This invention pertains to the conveying of vehicles particularly through automatic car washes, and more particularly, to method and apparatus for reducing the length of such a conveyor.

2. Description of the Prior Art

Vehicle conveyors have heretofor placed a driving roller behind the rear wheel of the vehicle for moving the vehicle along a desired path. This has been found to be the best way of conveying the vehicle. In order to move the vehicle in this manner, however, the vehicle must be driven its full length onto the area of the conveyor in which a roller can be raised into an active position behind the rear wheel. This requires approximately 25 feet of conveyor to be utilized even before the vehicle gets to the washing or other operating area of the conveyor. In many locations this 25 feet of room is either not available or if available, requires an undesirably high committment of expensively leased or owned land merely for getting the vehicle moving on the conveyor. In many locations where the room is not available a roller is directed behind a front wheel to push the vehicle in a less desirable fashion through the conveyor.

SUMMARY OF THE INVENTION

It is an object of this invention to convey a vehicle along a conveyor through a distance shorter than heretofor possible but by pushing against the rear wheel of the vehicle through most of the length of the conveyor.

It is another object of this invention to provide a method for reducing the length of an automotive vehicle conveyor.

It is still another object of this invention to provide a method and apparatus for car washing vehicle conveyors by which the vehicle is initially pulled onto the conveyor by pushing against the forward wheel of the vehicle and subsequently pushed by pushing against the rear wheel of the vehicle for most of the travel through the conveyor.

Basically these objects are obtained by a method and apparatus which provides a front wheel push to save room for initially loading the vehicle onto the conveyor and then automatically transfers the push to the rear wheel to continue the washing or other operation process to completion. Preferably this switching of the push from the forward wheel to the rearward wheel is done by an electrical circuit and a combination of roller up guides for moving a roller into an active track of a conveyor and a trap door or roller drop guide for moving the roller into an inactive position. The vehicle is driven or pushed onto the conveyor until the front wheel is passed the roller up guide, the operating sequence is started, the roller is moved up onto the active track of the conveyor by the roller up guide, and the vehicle is moved along the conveyor until the rear wheel is passed the roller up guide. Next, the active roller behind the forward wheel is moved off the active track by the roller drop guide and another roller is raised to the active track behind the rear wheel by the roller up guide.

As is readily apparent, a savings in the length of the conveyor slightly less than the wheel base of the smallest vehicle handled by the conveyor is achieved reducing the length of the conveyor.

BRIEF DESCRIPTION OF THE FIGURES OF THE DRAWINGS

FIG. 1 is a vertical section taken along the length of a standard 3-track vehicle conveyor but illustrating the improvements of this invention.

FIGS. 2A-2C are operational schematics illustrating the principles of the invention.

DETAILED DESCRIPTION OF THE PREFERRED EMBODIMENTS

Figure 3:
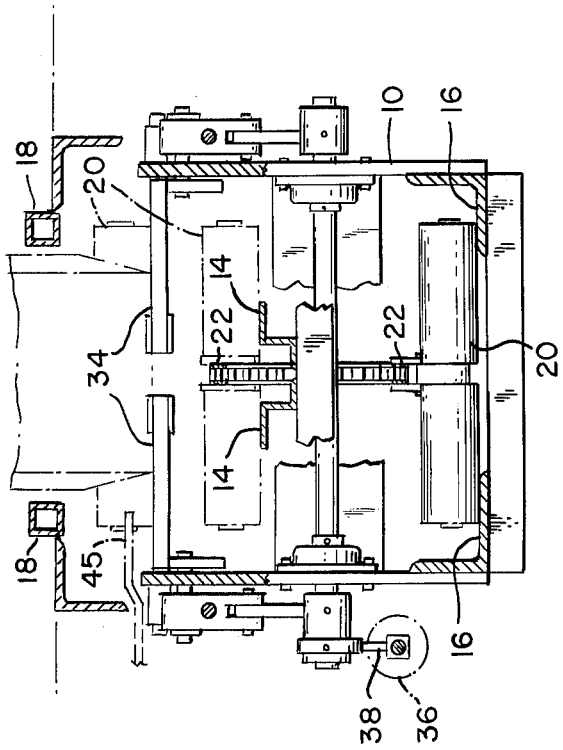
FIG. 3 is a vertical section taken along the line 3—3 of FIG. 1.

As best shown in FIG. 1, the conveyor includes a frame 10 mounted in the floor of a vehicle washing area. The frame includes an active track 12 which carries the vehicle tires and adjoins the driveway of the car wash, an inactive track 14, and a return track 16. Tire guide rails 18 align the wheels of the vehicle as the vehicle is moved along the active track 12. Rollers 20 are positioned according to a desired sequence either onto the active track or the inactive track, as will be described. A chain drive 22 moves the rollers and is driven by a conventional power source not shown. As thus far described, the apparatus is basically similar to that shown in copending patent application Ser. No. 278,258, filed Aug. 7, 1972, entitled "Wheel Spinning and Vehicle Conveying Apparatus for Automatic Wheel Washers."

As in prior vehicle conveyors, the upper track 12 is provided with a door 24 that is automatically raised by the rollers 20 as they are moved from the inactive track to the active track for engagement behind the wheel of a vehicle. For this purpose, a roller up guide 26 is coupled to a solenoid 28 for moving the roller up guide between its lower position shown in solid lines in FIG. 1 and a raised phantom line position for moving the roller up to the active track. The roller is lowered from the active track at the end of the conveyor through a slot 30 (FIG. 2) in a well known manner. At this final point the vehicle, if the roller is against the rear wheel of the vehicle, is free of a conveyor and can be driven or pushed out of the car wash area.

It is a unique feature of this invention that a second roller drop opening 32 is provided near the entrance of the active track to drop a roller from behind the wheel of a vehicle prior to the roller reaching the normal roller drop slot 30 at the end of the conveyor. For this purpose, a roller drop guide 34 is provided for movement between an upward position where it covers the opening 32 in the track to its lowered position, shown in phantom lines in FIG. 1, in which it guides a gravity dropped roller 20 down into the inactive track 14. By dropping a roller from the active track to the inactive track prior to reaching the drop roller slot 30 at the end of the conveyor, a driving roller can be engaged behind the front wheel of the vehicle to initially pull the vehicle onto the active track of the conveyor and subsequently drop clear of the path of the vehicle while allowing a second roller to move into the active track behind the rear wheel of the vehicle to move the vehicle through the remainder, preferably the longer extent, of the conveyor in the more desirable manner.

The roller drop guide 34 is moved from its upper position where it bridges the slot 32 by a solenoid 36. The solenoid 36 is connected to the guide 34 by a bell crank 38 having one arm connected to the solenoid and a second arm connected to a pivotal link 40 which can be moved into an over-center-position, as shown in FIG. 1, to positively lock the guide 34 in the upper position so that it can carry the weight of the wheel as it passes over the guide. An adjustable stop 42 is provided to align the guide flush with the active track and a second adjustable stop 44 is provided to establish the lowered position of the roller drop guide.

Figure 4:
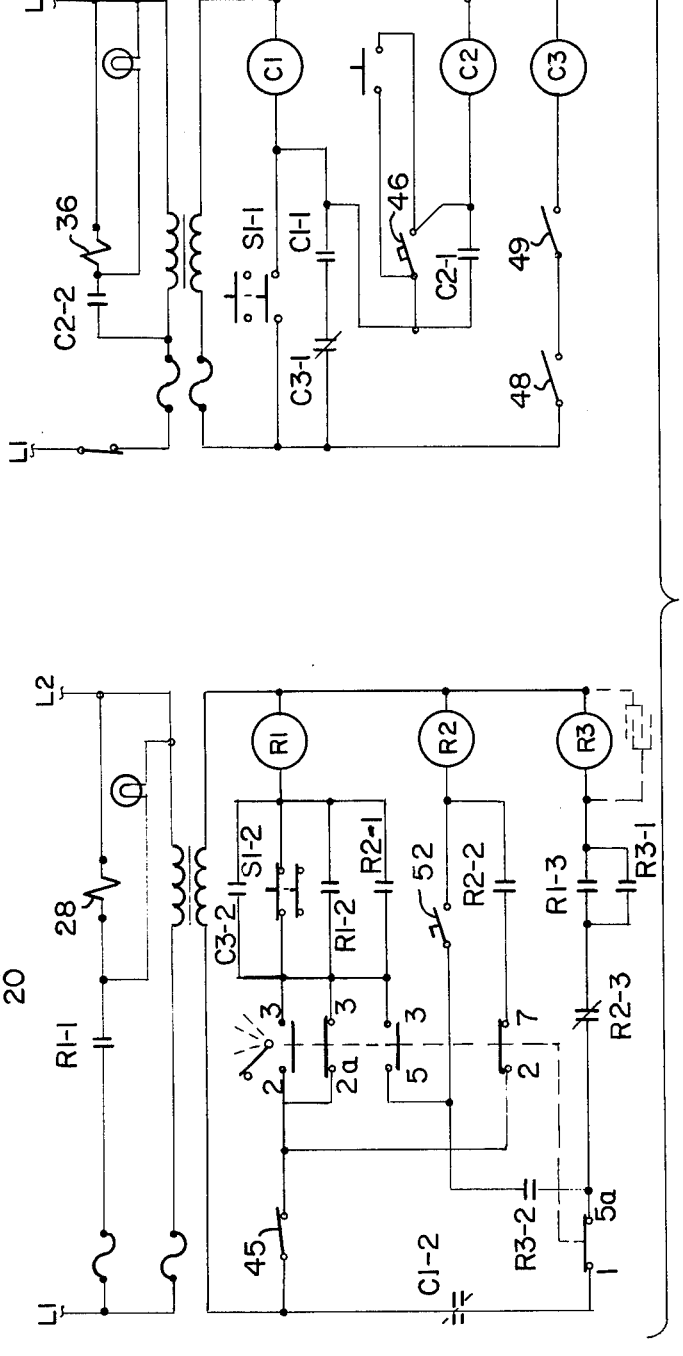
FIG. 4 is a circuit diagram embodying the principles of the invention.

The operation of the conveyor is best understood by reference to FIGS. 2A-2C in which five consecutive rollers 20 have been numbered 1 through 5, and by tracing the electrical schematic illustrated in FIG. 4. The control circuit is normally operated in the semi-automatic mode in which switch contacts 2a-3, 2-7 and 1-5a are closed. When a vehicle C has been driven or pushed onto the active track 12 of the conveyor so that its front wheels are in advance of the roller up slot 23 as shown in FIG. 2A, the car wash operator closes a normally open push button switch closing contacts S1-2 and S1-1. Closing contacts S1-2 energizes relay R1 whereas contacts S1-1 energize relay C1. Relay C1 is locked in by contacts C1-1, and relay R1 is locked in by contacts R1-2 when contacts S1-2 and S1-1 open upon release of the push button switch by the operator. Contacts R1-1 are closed by relay R-1 to energize the roller up solenoid 28 so that the next roller from the conveyor will pass up through the slot 23 and engage the back of the front wheel of the vehicle as shown by roller 1 in FIG. 2A. Once this roller is on the active track, it then shortly engages and opens a normally closed cancel switch 45 which de-energizes relay R1. De-energization of relay R1 opens contacts R1-1 thereby de-energizing solenoid 28 and lowering roller up guide 26 to keep the next roller (designated 2) on the inactive track 14.

The initial energization of relay C1 through switch contacts S1-1 also resulted in opening normally closed contact C1-2 so that the circuits to relays R2 and R3 via contact 1-5a were open during the operational sequence necessary to bring a roller behind the front wheel of the vehicle. The next operational sequence is the dropping of the roller from behind the front wheel as shown in FIG. 2B. This occurs by engagement with the front wheel of the vehicle of a roller drop treadle which closes a normally open roller drop treadle switch 46 to energize relay C2. This relay is locked in through contacts C2-1 and closes contacts C2-2 thereby energizing solenoid 36 which lowers the roller drop guide 34 so that the roller behind the front wheel of the vehicle will disengage and drop back to the inactive track of the conveyor. As the guide 34 is moved to its lower position (phantom lines in FIG. 1), it engages a cancel load switch 48 and the front wheel simultaneously engages cancel switch 49. This results in momentary completion of a circuit through relay C3 to open normally closed switch C3-1 thereby de-energizing relays C1 and C2, energizing relay R1 through contacts C3-2, and permitting contacts C1-2 to close. De-energization of relay C2 opens contacts C2-2 de-energizing solenoid 36 to move the roller drop guide 34 back to its upper position. Energization of relay R1 closes contacts R1-3 to energize relay R3 which becomes locked in through contacts R3-1. Contacts R3-2 are closed by relay R3 to enable a circuit to relay R2 when a second treadle to close a normally open switch 52 is depressed by the rear wheel of the vehicle. Since the relay R1 had energized roller up solenoid 28 the next roller (designated 3) moves through the roller up slot 23 and travels forwardly into engagement with the rear wheel of the vehicle to propel the vehicle through the remainder of the conveyor in the more desirable mode of rear wheel pushing.

As the roller 3 moved along the active track from the roller up slot 23 to the rear wheel it engaged cancel switch 45 thereby again de-energizing relay R1 and the roller up solenoid 28. However, relay R3 remains energized so that when the rear wheel closes the treadle switch 52 after being engaged by the roller 3, relay R2 becomes energized and locked in through contacts R2-2. Normally closed contacts R2-3 are opened by relay R2 thereby de-energizing relay R3 resulting in the opening of contacts R3-2. In this regard, contacts R2-3 have a built in time delay which allows lock-in of relay R2 by the closing of contacts R2-2 prior to de-energization of relay R3. Contacts R2-1 are closed by relay R2 which again energizes relay R1 and roller up solenoid 28. Consequently, a second roller (designated 4) now moves up through the roller up slot and trails the roller which is engaged with the rear wheel. This is a safety roller to insure that the vehicle will be moved should the roller in engagement with the rear wheels somehow slip by the wheel. As soon as the spare roller 4 reaches the active track, it engages cancel switch 45 and again breaks the circuit to R1 and R2. At this point, all the circuits have beome de-energized and await reactivation by the push button control of the operator as the next car to be washed is brought into position. In the meantime the next roller (designated 5) and the rollers following thereafter remain on the inactive track 14. When the vehicle C reaches the end of the active track 12 the roller 3 behind the rear wheel drops through the slot 30 as indicated in FIG. 2C.

The circuit can also be operated in a manual mode in which only the contacts 2-3 are closed, rather than the contacts 2a-3, 5-3, 2-7 and 1-5a. In those modes the relays R2 and R3 are never activated, and hence R1 can only be reactivated after each opening of switch 45, by again engaging the push button to close switch S1-2.

In the automatic mode contacts 2a-3 and 5-3 are closed and contacts 2a-3, 2-7, and 1-5a are open. Because contacts 5-3 are closed, relay R2 is energized via contacts 5-3, 2-3, and switch 45, each time that treadle switch 52 is closed by a wheel. Hence, because switch R2-1 which is closed by relay R2, closes a circuit to relay R1, relay R1 is also energized each time that treadle switch 52 is closed. This results in an energizing of solenoid 28 and the moving of a roller 20 up to the active track whenever a vehicle is driven onto the track for enough to close the treadle switch 52.

While various modifications to the circuitry and other details of the invention will be readily apparent to one skilled in the art, it should be understood that the principles of the invention are not limited to these specific embodiments illustrated and described.

The embodiments of the invention in which a particular property or privilege is claimed are defined as follows:

1. A compact conveyor for moving a vehicle by sequentially engaging one each of the front and rear wheels of the vehicle and moving them along a path, comprising:
    an active track for supporting the wheels of the vehicle and having a roller drop slot intermediate its ends,
    an inactive track paralleling said active track and lying therebelow, a plurality of spaced rollers positionable along said inactive track and also along said active track for engaging the wheels of the vehicle on said active track, said rollers being spaced apart less then the length of said active track, drive means having a roller driving run for moving the rollers along said inactive track or active track, means for selectively moving the rollers into said active track for propelling a wheel or for moving the rollers along said inactive track for by-passing the wheels, roller removing means for selectively removing a roller in engagement with a front wheel of the vehicle from the active track to the inactive track through said roller drop slot to disengage the roller prior to the termination of said roller driving run so that the roller no longer propels the front wheel still resting on the active track, said roller removing means including a roller drop guide, an over-center linkage for holding the roller drop guide in a raised wheel-passing position covering said roller drop slot for supporting the weight of a vehicle wheel, and power means operatively connected to said linkage for selectively positioning the roller drop guide between said raised wheel-passing position and a lowered roller-dropping position exposing the roller drop slot, and control means for actuating said power means to remove a roller and actuating said means for moving a roller into the active track for bringing a subsequent roller into engagement with a rear wheel of the vehicle in a sequence to first move the vehicle by pushing against the front wheel and then moving the vehicle through the remainder of said driving run by pushing against the rear wheel.

2. A compact conveyor system for moving a vehicle with front and rear wheels forwardly along a path, comprising:

an active track for supporting the wheels of a vehicle, a return track paralleling said active track, and an inactive track between said active and return tracks and extending the full length thereof, an endless conveyor between said inactive and return tracks, wheel pushers spaced apart and continuously pulled by said conveyor to move forwardly along said active or inactive tracks and then rearwardly along said return track while said conveyor is in operation, activating means for selectively moving the wheel pushers onto said active track at an engaging location near the rear end thereof for propelling a vehicle wheel forwardly or for moving the wheel pushers onto said inactive track for bypassing the wheels, removing means for selectively removing a wheel pusher in engagement with a front wheel of the vehicle from the active track to the inactive track at a disengaging location in the rear part of the active track spaced forwardly of the engaging location a distance greater than the wheel base of the vehicle so that the pusher no longer propels the front wheel, and control means for activating said removing means for selectively removing a wheel pusher in engagement with a front wheel from the active to the inactive track and actuating said activating means for first bringing a subsequent wheel pusher onto said active track and then bringing a spare wheel pusher onto said active track in a sequence to first move the vehicle by pushing against a front wheel thereof and then moving the vehicle along the remainder of the active track by pushing against a rear wheel thereof by said subsequent wheel pusher or said spare wheel pusher if said subsequent wheel pusher loses wheel engagement.

* * * * *